US008117310B2

(12) United States Patent
Becker et al.

(10) Patent No.: US 8,117,310 B2
(45) Date of Patent: Feb. 14, 2012

(54) METHOD FOR THE CENTRAL CONTROL OF RESOURCES IN EXPANDABLE MEDICAL PLATFORMS

(75) Inventors: Detlef Becker, Möhrendorf (DE); Karlheinz Dorn, Kalchreuth (DE); Sten Löcher, Erlangen (DE); Artur Pusztai, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 204 days.

(21) Appl. No.: 12/318,807

(22) Filed: Jan. 8, 2009

(65) Prior Publication Data

US 2009/0182879 A1 Jul. 16, 2009

(30) Foreign Application Priority Data

Jan. 16, 2008 (DE) .................. 10 2008 004 658

(51) Int. Cl.
*G06F 15/173* (2006.01)

(52) U.S. Cl. .......... 709/226; 709/229; 709/200; 700/99; 718/102; 718/103; 718/104; 717/103; 705/7.12

(58) Field of Classification Search .................. 709/200, 709/226, 229; 718/103, 104, 102; 717/103; 705/7.12
See application file for complete search history.

(56) References Cited

U.S. PATENT DOCUMENTS

| 5,517,644 | A | * | 5/1996 | Murdock | 705/7.26 |
|---|---|---|---|---|---|
| 5,621,886 | A | * | 4/1997 | Alpert et al. | 714/38.13 |
| 6,289,115 | B1 | * | 9/2001 | Takeo | 382/130 |
| 6,470,406 | B1 | * | 10/2002 | Dillenberger et al. | 710/200 |
| 6,505,229 | B1 | * | 1/2003 | Turner et al. | 718/107 |
| 6,721,948 | B1 | * | 4/2004 | Morgan | 718/102 |
| 6,988,139 | B1 | * | 1/2006 | Jervis et al. | 709/226 |
| 7,281,049 | B2 | * | 10/2007 | Verma et al. | 709/229 |
| 7,340,742 | B2 | * | 3/2008 | Tabuchi | 718/103 |
| 7,509,671 | B1 | * | 3/2009 | Bedell et al. | 726/6 |
| 7,548,335 | B2 | * | 6/2009 | Lawrence et al. | 358/1.15 |
| 7,747,406 | B2 | * | 6/2010 | Boing et al. | 702/108 |
| 7,752,622 | B1 | * | 7/2010 | Markov | 718/103 |
| 7,835,931 | B2 | * | 11/2010 | Bayne | 705/7.38 |
| 7,844,968 | B1 | * | 11/2010 | Markov | 718/102 |
| 2002/0135794 | A1 | * | 9/2002 | Rodriguez et al. | 358/1.15 |
| 2003/0069756 | A1 | * | 4/2003 | Higginbotham et al. | 705/2 |
| 2003/0120776 | A1 | * | 6/2003 | Avvari et al. | 709/225 |
| 2004/0001215 | A1 | * | 1/2004 | Kurotsu | 358/1.13 |
| 2004/0148534 | A1 | * | 7/2004 | Orenstien et al. | 713/320 |
| 2004/0167465 | A1 | * | 8/2004 | Mihai et al. | 604/67 |
| 2004/0205048 | A1 | * | 10/2004 | Pizzo et al. | 707/3 |

(Continued)

OTHER PUBLICATIONS

Klara Nahrstedt, Hao-hua Chu and Srinivas narayan: QoS-aware resource management for distributed multimedia applications; Journal of High Speed Networks 7 (1998) p. 229-257; 1998; US, IOS Press.

*Primary Examiner* — John Follansbee
*Assistant Examiner* — Anthony Mejia
(74) *Attorney, Agent, or Firm* — Harness, Dickey & Pierce, P.L.C.

(57) ABSTRACT

A method of at least one embodiment uses a central instance for receiving all orders within the platform. A meta interface regulates the assignment of resources to orders. In addition, in at least one embodiment, each order is performed by at least one process handler. This assures the deadlock-free use of resources within the platform. Furthermore, at least one embodiment of the invention allows controlled stopping of active process handlers and hence interruption of running processes.

15 Claims, 2 Drawing Sheets

U.S. PATENT DOCUMENTS

| | | | |
|---|---|---|---|
| 2004/0215780 A1* | 10/2004 | Kawato | 709/226 |
| 2004/0243444 A1* | 12/2004 | Steusloff et al. | 705/2 |
| 2004/0263904 A1* | 12/2004 | Sobko | 358/1.15 |
| 2005/0165881 A1* | 7/2005 | Brooks et al. | 709/200 |
| 2006/0037021 A1* | 2/2006 | Anand et al. | 718/102 |
| 2006/0193006 A1* | 8/2006 | Lawrence et al. | 358/1.16 |
| 2006/0224432 A1* | 10/2006 | Li | 705/9 |
| 2007/0044102 A1* | 2/2007 | Casotto | 718/103 |
| 2007/0150329 A1* | 6/2007 | Brook et al. | 705/8 |
| 2008/0098401 A1* | 4/2008 | Weatherhead et al. | 718/104 |
| 2008/0189417 A1* | 8/2008 | Dea et al. | 709/226 |
| 2008/0250418 A1* | 10/2008 | Karamchedu | 718/104 |
| 2008/0312967 A1* | 12/2008 | Piper et al. | 705/3 |
| 2009/0164474 A1* | 6/2009 | Noumeir | 707/10 |
| 2010/0064043 A1* | 3/2010 | Iino et al. | 709/226 |
| 2011/0071667 A1* | 3/2011 | Spano et al. | 700/231 |

* cited by examiner

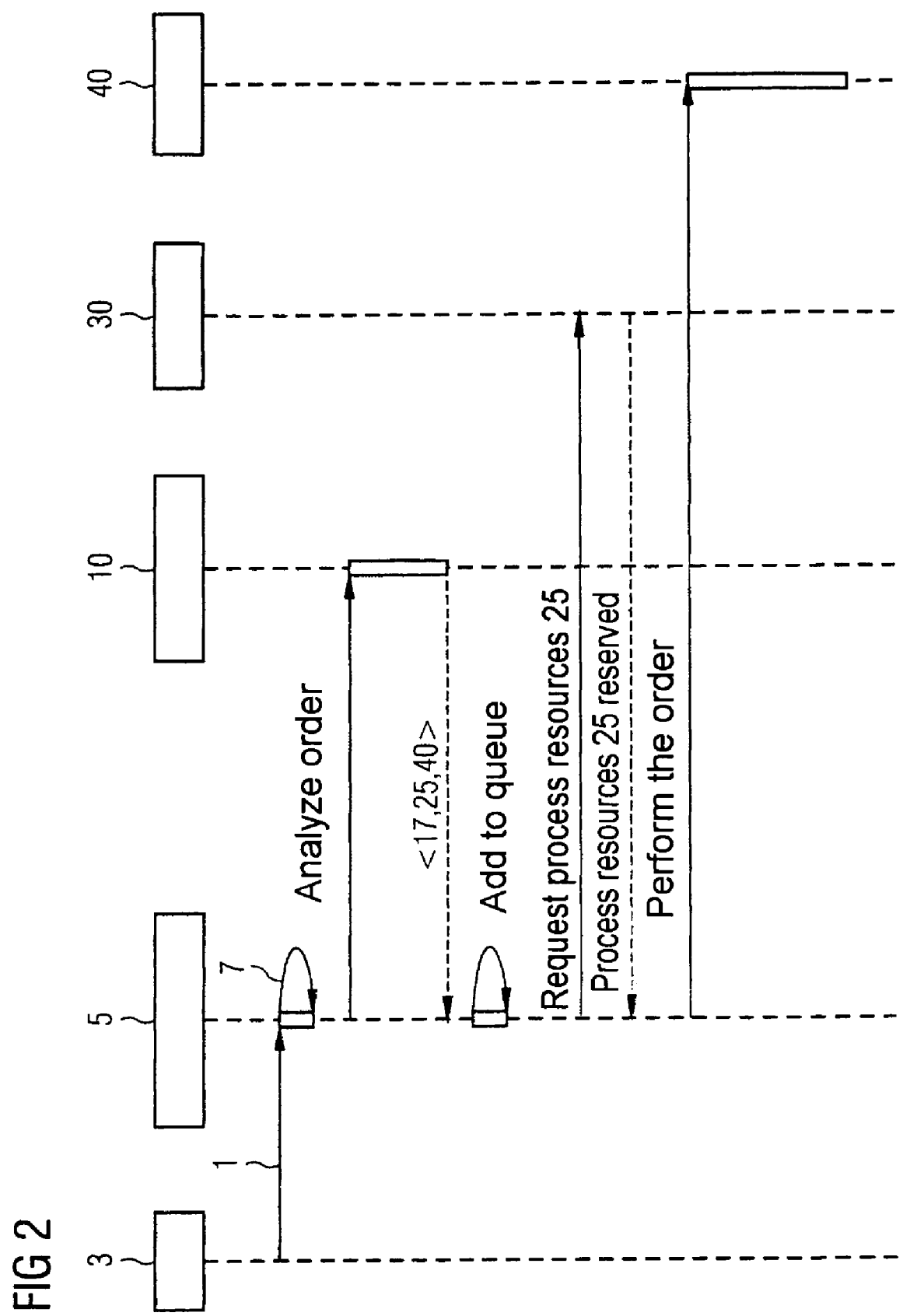

METHOD FOR THE CENTRAL CONTROL OF RESOURCES IN EXPANDABLE MEDICAL PLATFORMS

PRIORITY STATEMENT

The present application hereby claims priority under 35 U.S.C. §119 on German patent application number DE 10 2008 004 658.2 filed Jan. 16, 2008, the entire contents of which is hereby incorporated herein by reference.

FIELD

Embodiments of the invention generally relate to a method for the central control of resources in expandable medical platforms.

BACKGROUND

Medical expandable platforms usually comprise complex hardware for examining patients, central and distributed hard disks for storing large volumes of data. Expandable medical platforms can be used both for managing medical patient data and for organizing clinic procedures, therapy planning, clinic management and the like, as are known to a person skilled in the art. Medical expandable platforms also comprise a multiplicity of nodes or clients which can access stored data, can initiate processes and possibly have access to complex hardware of a medical modality.

Modern medical modalities, such as magnetic resonance tomography (MR tomography), are characterized by the use of complex hardware appliances e.g. an MR scanner, and numerous complex processes, for example ranging from capture of the raw data through reconstruction of images of the inside of a patient's body to methods for diagnosis making and diagnosis support.

In a modern medical modality, the scanner has a real-time operating system. Such a real-time operating system ensures that the state of the scanner is determinate at any time. This means that the behavior of the processes in a real-time operating system, what are known as real-time processes, is known at any time. Besides real-time processes, such as the capture of raw data when examining a patient, there are a multiplicity of processes in connection with a medical modality which are not controlled by a real-time operating system and to a certain extent run in the background. This means that ideally they are not noticed by the user. These processes include the reconstruction of images from a 3D data record or, by way of example, the calculation of microcalcifications in the female breast for diagnosis support and therapy planning.

In contrast to the real-time processes which are executed on a scanner, for example, processes have to date been characterized in that the behavior of the processes is not deterministic. This means that in an expandable medical platform a multiplicity of processes are executed simultaneously. It may therefore arise that, by way of example, the writing of raw data to the hard disk of a scanner is slowed down considerably or, in the worst case, no longer possible at all if too many processes are running in parallel which simultaneously access the hard disk of the scanner. That is to say that a large number of I/O operations on the hard disk of a scanner can restrict the performance of the scanner, e.g. when scanning a patient.

A slower response by the scanner loses valuable time, e.g. when examining a heart attack patient. The small time window which remains for successful therapy on such a patient means that it is necessary to have a deterministic behavior for processes within the medical platform in order to provide for an assured quality of the services available within the expandable medical platform even in the event of a medical emergency.

Possible solutions to this problem are separate emergency systems, for example for making diagnoses, which are used exclusively for emergencies. Such a practice is expensive, since separate emergency systems normally need to be kept available unused. The high costs of an additional, separate emergency system are therefore not justified.

It would also be possible to allow none of the processes on clients which are required in the event of an emergency. Such a practice is likewise expensive, since further clients are necessary which exclusively perform the processes arising within the expandable medical platform. Furthermore, the increasing networking of all clients or nodes within an expandable medical platform (platform, for short) requires data to be able to be received and sent from all clients. For a platform client on which no processes are permitted, particularly no network access to this client or from this client to others would be possible.

To solve the problem described above, it would also be conceivable to use special operating systems for clients on which processes run. In this case, the special operating systems would need to assure a constant quality of service. Special operating systems of this kind are known to a person skilled in the art. However, the programming complexity for such quality of service systems is high, which means additional maintenance complexity, training times for the programmers, and also additional program translation operations for target systems, that is to say clients, running under the special operating system. In addition, there is an increase in the test complexity for the clients on which processes run under the special operating system.

It would also be conceivable to tie processes to selected dedicated CPUs. Although this would allow the availability of the CPU resource to be controlled, it still does not result in any influence on I/O activities taking place which have been initiated by processes. That is to say that the desired deterministic behavior for an emergency system would still not be assured.

It would also be possible to lower the priorities for processes. Such methods are normally provided by operating systems and are known to a person skilled in the art. Lowering the priorities for processes possibly has an adverse effect on the scheduling behavior of the entire client controlled by the operating system or the entire platform. However, an approach of this kind presupposes that every single process is implemented as a process at operating system level. With the large number of processes running within a platform, this approach is not very effective. Furthermore, changing the operating system priorities for processes in this way still does not mean a deterministic behavior in emergency situations.

SUMMARY

At least one embodiment of the invention ensures that resources of the platform are reliably available in emergency situations. Furthermore, at least one embodiment of the invention assures deterministic behavior by the processes during normal operation of the platform too while observing the requisite quality of service.

Embodiments of the method are described below. Features, alternative implements and/or advantages mentioned in this context can likewise be transferred to the other claimed subject matter, and vice versa. In other words, it is possible for the article-based claims to be developed with the features which are described or claimed in connection with embodiments of the method. The relevant functional features of the method are in this case formed by corresponding article-based modules, particularly by hardware modules and/or software modules of the system.

In at least one embodiment, a computer-implemented method is disclosed for controlling allocations of resources to processes in expandable medical platforms with a central instance and a meta interface for resources.

An order type within the context of at least one embodiment of the invention is a conceptual entity, in other words a "form template", which describes what information a client sending an order must indicate in order to specify an order adequately. By way of example, a print order type indicates that the client needs to indicate a printer name, a document name and a print mode.

An order within the context of at least one embodiment of the present invention is an actual (tangible) instance of an order type. That is to say an actual instruction regarding precisely what needs to be done. In the case of a print order, for example: printer name="MyPrinter", document name="Fischer.dcm" and print mode="600dpi".

A process handler or an order handler within the context of the present invention is the implementation of a service which can perform an order. The terms order handler and process handler are used synonymously in this description.

The process handler is executed in a process. That is to say that the process is an execution container for the process handler. The process handler can only ever perform precisely one order at a time. The process handler can be converted such that it can also perform orders of different order types, but only ever in strict sequence, one order type after the other. Furthermore, the process handler has a multiplicity of interfaces which the central instance requires in order to stop, continue or terminate execution of the orders by process handlers. The process handler knows at least one order type but may also understand a plurality of order types.

One or more process handlers may be executed in the process. In this case, the number of process handlers within a process is configurable. In other words, a process within the context of at least one embodiment of the invention is an instantiation of one or more process handlers.

Process or background processes within the context of this invention are computer-based activities which normally take place without the user noticing. Furthermore, the processes are processes which are not controlled by a real-time operating system, such as processes on a scanner, as already mentioned at the outset.

The processes can run at operating system level and can control the way in which a computer system works. A client within the context of the present invention is a computer system of this kind, for example.

Preferably, a process within the context of at least one embodiment of this invention means an instance of an executable unit, an executable, that is to say of executable program code. The process handler is an executable program code which is executed in a process as an instantiation of a process handler.

The processes run within the medical platform and control the way in which the medical platform works.

A process may be the display of MR images, for example. Other examples of processes within the context of the invention may be the printing of image data, and also the loading of image data from the disk store of the platform.

Processes are initiated by orders for processes, which are normally triggered by a user of a client. Processes are also an instantiation of a process handler for an order type, as already mentioned.

An example of an order is "Show the MR data for the patient Fischer". Orders may be of quite different type and are respectively characterized by an order type. For example, "calculate the microcalcification for the patient Müller" is another order, the order type of which differs from the preceding example.

An order for a process is received by the central instance and is also characterized by an order type.

That is to say that the central instance need know nothing other than the order type of an incoming order. Dependent on the order type of the order, the central instance assigns the order to a queue allocator.

The queue allocator analyzes the order and ascertains a multiplicity of process resources for the order from all resources available in the system which are required for performing the order. In addition the queue allocator ascertains the queue in which the order needs to be deposited.

Next, the central instance requests the process resources as ascertained by the queue allocator. This request by the central instance is made to a multiplicity of meta interfaces which respectively manage resources of one type.

If the central instance succeeds in engaging all process resources for the process, the process is executed. Following the conclusion of the process, the process resources are released and the meta interfaces are informed about the release of the process resources. In this case, deterministic behavior by the processes is assured within the platform.

Within the context of this description, resources are to be understood to mean: appliances, appliance components and equipment. By way of example, resources may be a printer, a dedicated piece of graphics hardware for reconstructing image data from a modern medical modality, access to the network or access to disk stores. Other resources within the platform are obvious to a person skilled in the art.

The central instance within the context of at least one embodiment of the invention coordinates the execution of the incoming orders for processes and ensures that the orders are performed deadlock-free by using the resources available within the platform. In this case, the orders are performed by processes. The processes are the instantiation of the respective process handler, as already mentioned.

As part of at least one embodiment of the invention, an explicit protocol for managing processes is proposed. The central instance influences the execution of orders using control messages to the process handlers, i.e. it stops the process handlers or has them continue execution. That is to say that the central instance does not necessarily stop an entire process, in which several different process handlers may be running, of course. In particular, processes are managed in line with at least one embodiment of the present invention via the central instance. Hence, the total number of all processes running within the platform is known.

Both features of embodiments of the invention, that is to say the protocol for stopping processes and also the central instance for controlling the processes, allow a multiplicity of processes in the platform to be stopped, to a certain extent "when called", provided that an emergency situation is arising.

The control of processes in expandable medical platforms is thus undertaken by the central instance. The central instance registers all orders for processes, a multiplicity of queues and queue allocators which are managed by the central instance. In this case, the queues may be different—depending on the order type.

The method according to at least one embodiment of the invention also comprises a meta interface for managing all resources available in the platform. The method according to at least one embodiment of the invention assures deterministic behavior for all processes within the platform. The invention allows one or all process(es) within the system to be stopped, and thus sufficient resources to be assured for immediate reaction to an emergency situation. Such an emergency situation may result in the examination of a heart attack or trauma patient, for example.

The method according to at least one embodiment of the invention allows a plurality of orders for processes to be received on the central instance simultaneously. Similarly, the central instance can execute a plurality of process handlers in parallel, so long as the process resources for the plurality of process handlers have been able to be allocated to the plurality of process handlers successfully.

The system may comprise a plurality of queues for orders of different type. Preferably, each order type is assigned an individual queue. Queues within the context of at least one embodiment of the invention may be in the form a hardware module and/or software module.

It is advantageous to use different queues for different order types. With separate queues for different order type, individual queues can be implemented according to need and in a resource-saving fashion.

It goes without saying that it is possible, on the basis of another embodiment of the invention, to use a single queue for all order types. However, the management of a single queue of this kind would be significantly more complicated. Furthermore, the modularity of the method would then be reduced.

The orders of one order type are performed by at least one process handler. The at least one process handler is started by the central instance. Which process handler is used is stipulated by the order type of the order.

The method of at least one embodiment allows a running process handler to be stopped, which assures deterministic interruption of the processes.

Thus, each of the processes within the platform can be stopped, and restarted, so that the further handling by the respective process handler is possible after an interruption.

Furthermore, the central instance can receive a warning indicating that a critical state will be reached shortly. The central instance then does not start another process handler but allows the active process handlers to continue operating.

Provision is also made for each of the process handlers which are active within the platform to be able to be stopped and to be able to be enabled again for further handling. This frees resources in a controlled and reliable manner, for example for an emergency. In line with at least one embodiment of the invention, the stopping and freeing are performed by the central instance.

In addition, the interruption of at least one order can be initiated by the reception of a notification on the central instance (e.g. upon a medical emergency event). At least one process is then automatically stopped until sufficient resources (for handling the emergency) are available.

Furthermore, the invention allows new order types initiating new process types, to be added to the system. In particular, the invention allows the new process types to be added at runtime. This is extremely convenient for the user, since service engineers or third-party providers can add further order types or new functionalities in connection with new order types to a certain extent at the touch of a button.

In addition, the provision of new functionalities for the platform in the form of new process types is simplified, since a third-party provider need no longer bother about managing queues for its new process.

The task of the meta interface in this case is to distribute the resources which are required for a process.

When resources are available for a process, they are engaged by the meta interface as what are known as process resources. Preferably, each of the meta interfaces engages process resources for one order type and, following successful completion of the order, releases the process resources again. If the process resources are unavailable, the order remains in the queue and the order is not performed immediately. In this case, the central instance takes care of performing the order at a later time.

The individual components of at least one embodiment of the invention are in modular form, so that the queues and/or the queue allocators, the process handler and the meta interface for an order type can each be changed independently of one another. This simplifies the expansion and programming of individual process types.

An order is characterized by its order type and may furthermore comprise a multiplicity of parameters. By way of example, such parameters may be resolution in which the image data of a print order are printed. Other order parameters are obvious to a person skilled in the art.

The central instance, the queues, the queue allocators, the meta interfaces and the process handlers within the context of at least one embodiment of the invention can each be implemented as hardware modules and/or as software modules.

At least one embodiment of the invention may also be implemented by an apparatus which undertakes the control of allocations of resources to processes in expandable medical platforms. The apparatus comprises a central instance for receiving an order for a process. The order is characterized by its order type and may also comprise other order parameters.

The entries received in a reception module are, depending on the order type, analyzed by a queue allocator and allocated to a queue. In addition, the queue allocator ascertains the process resources from all resources available in the platform and notifies the central instance of the process resources. The central instance then requests the process resources from the meta interfaces for the process resources. The process resources are allocated to the order, provided that they are available. The order is performed, provided that all process resources are available. Following the conclusion of the process, the process resources are released and the respective meta interfaces are informed about the release of the resources. This assures deterministic behavior by the process within the platform.

Another example embodiment is directed to a computer program product which can be loaded into the memory of a computer. The method according to at least one embodiment of the invention is implemented by computer program code which maps the individual steps of the method.

Another example embodiment is directed to a storage medium which is intended for storing at least one embodiment of the computer-implemented method described above and can be read by a computer.

Furthermore, it is possible for individual components of at least one embodiment of the method described above to be able to be performed in one saleable unit and for the remaining components to be performed in another saleable unit—as a distributed system, so to speak.

BRIEF DESCRIPTION OF THE DRAWINGS

The detailed description of the figures which follows discusses example embodiments, which are to be understood as non-limiting, with the features and further advantages thereof with reference to the drawings, in which:

FIG. 2 shows a flow of data based on an example embodiment of the invention.

DETAILED DESCRIPTION OF THE EXAMPLE EMBODIMENTS

Figure 1:
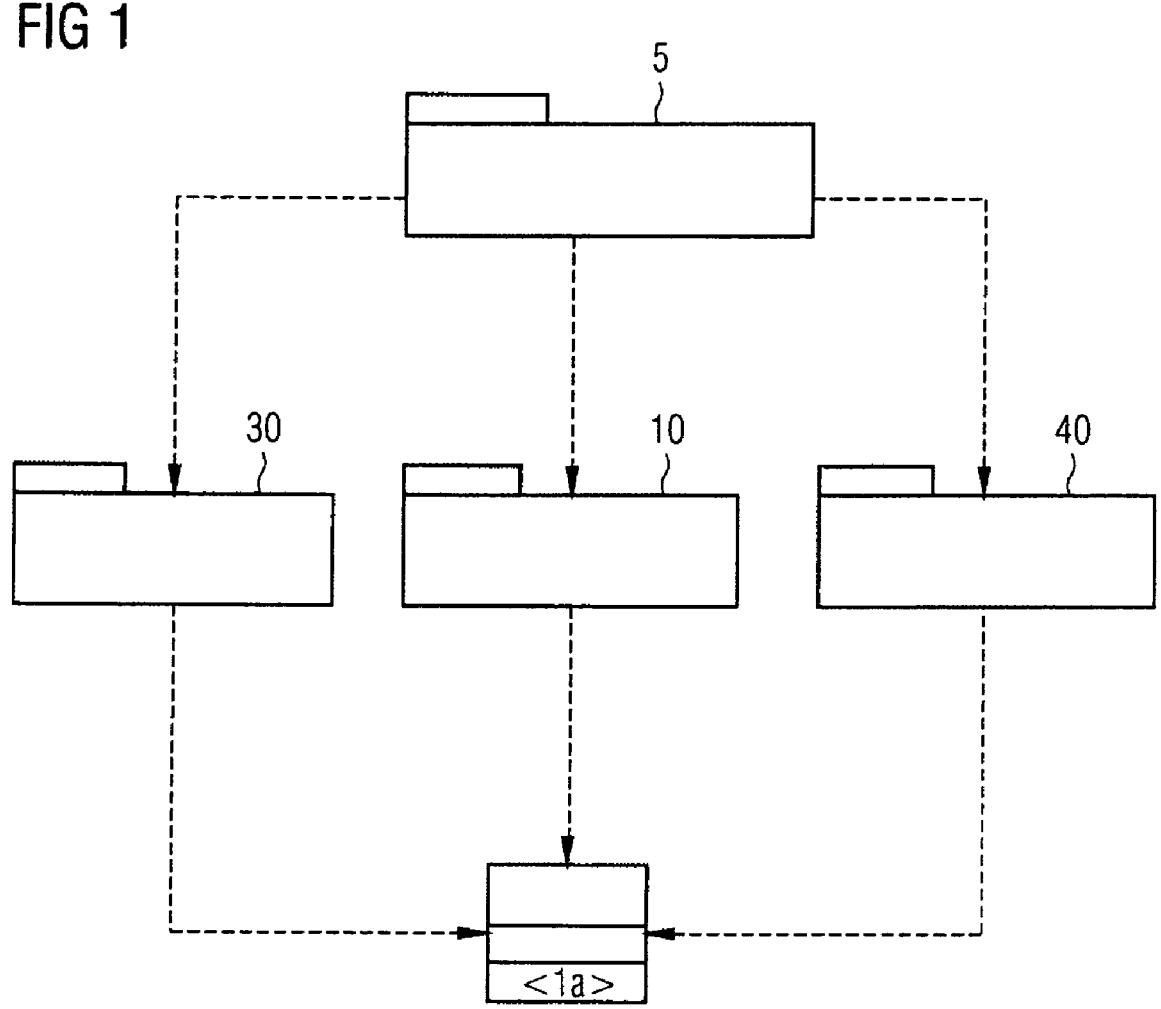
FIG. 1 shows an illustration in overview form.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows the individual components of an embodiment of the invention. An embodiment of the invention comprises a central instance 5, a queue allocator 10, an order 1 of an order type 1a for a process 4 (not shown) which is initiated on a client 3 (not shown), a meta interface 30 and a process handler 40 for performing the order 1. In this case, the client 3 is an arbitrary node within the platform.

Processes 4 within the context of an embodiment of the invention may be computer-based, operating-system-internal activities of the kind which are normally executed unnoticed by the user. Furthermore, the processes 4 are processes of the kind which are not controlled by a real-time operating system, such as processes on a scanner.

Preferably, a process within the context of embodiments of the invention means an instance of an executable unit, an executable, that is to say of executable code. By way of example, the process handler comprises executable program code which becomes a process as instantiation of a process handler. An example embodiment of a process is therefore not necessarily an operating system process, as mentioned further above.

It goes without saying that an embodiment of the invention can also be used on medical platforms which do not necessarily comprise a scanner, even though an embodiment of the invention is described below with reference to a modern medical modality of this kind.

The user of a client 3 can initiate processes 4 within the context of the invention by orders 1. There is a multiplicity of the processes 4 within the platform. Different processes 4 are characterized by an order type 1a. Examples of order types are: a print order type, a DICOM transfer order type, an order type for computer aided diagnosis and the like.

The printing of the image data from a series of images for the patient "Fischer" on the printer MyPrinter is an example of a process 4 within the context of the invention. The client 3 would thus initiate the order "Print the series of images for the patient Fischer in 600 dpi on MyPrinter using paper format A3 with 4×4 images per page in 32 grayscales", for example. In this case, the print order denotes the order type 1a, while all other parameters, for example the number of dpi or the specific printer or the resolution of the images, are what are known as order parameters 2.

An example will be used below to illustrate the method for managing a multiplicity of processes 4 within the expandable medical platform. The expansion of an embodiment of the invention to further order types 1a is clear to a person skilled in the art and is not a restriction for an embodiment of the present invention.

FIG. 2 shows the activities for a process 4 and the interplay of individual components of the apparatus according to the invention for performing the method according to an embodiment of the invention.

The order 1 initiated by a client 3 is received by a central instance 5. The order 1 is characterized by the order type 1a. In line with an embodiment of the invention a task of the central instance 5 is to receive a multiplicity of orders 1 of different order type 1a from different clients 3 within the platform.

For each of the order types 1a there is a queue allocator 10. The queue allocator 10 ascertains a queue name 17 for an actual order 1 of the order type 1a and returns it to the central instance 5. That is to say, in other words, that the central instance 5 has all information for an incoming order 1, as a result of knowledge of the order type 1a, in order to use the association 7 to ascertain the queue allocator 10 which fits the given order type 1a.

The multiplicity of queue allocators 10 are in the form of a standalone module, preferably in the form of a software module.

The order 1 is now deposited in a queue 15 by the central instance 5 until the order 1 can be handled. The queues 15 are created and dismantled dynamically the central instance 5.

Besides the queue name 17, the queue allocator 10 also ascertains the resources 20 required for performing an order 1. The resources required for an order are subsequently called process resources 25. The process resources 25 are characterized in that the process resources 25 need to be available for the order 1, since if the process resources 25 are unavailable then the order 1 cannot be performed by a process handler 40. The queue allocator 10 communicates the queue name 17, the process resources 25 and the process handler 40 for an order 1 to the central instance 5.

Provided that the queue 15 with the queue name 17 does not yet exist, the queue 15 is created by the central instance 5 and the order 1 is deposited in the queue 15 by the central instance 5. The creation and the management of the queues 15 by means of the central instance 5 frees the process handler 40 for performing orders 1 of the order type 1a from the obligation to manage incoming orders 1 of the type 1a itself in queues 15.

The allocation of the process resources 25 to the order 1 of the order type 1a is coordinated by means of a multiplicity of meta interfaces 30. Single cases of the meta interfaces 30 manage process resources of one type. Such process resources of one type may be, by way of example: the access to a printer, the provision of main memory and CPU computation power on dedicated graphics hardware for reconstructing image data. Other types of process resources are clear to a person skilled in the art.

The central instance 5 now attempts to reserve the process resources 25 for the order 1 in one of the queues 15 on the meta interfaces 30 appropriate to the process resources 35. Whenever the central instance 5 succeeds in requesting all of the process resources 25 for an order 1 from the meta interfaces 30, the central instance 5 starts the process handler 40.

Each order type 1a has an associated process handler 40. The process handler 40 provides a technical service in response to an order 1. Preferably, the process handler 40 is in the form of a software module which performs the order 1. By way of example, a process handler 40 could prepare the resolution of patient data (MR tomography data for the patient Fischer) for printing. That is to say, by way of example, distribute the grayscales as appropriate, stipulate how many individual pictures are printed per DIN-A4 page, and in what resolution and size.

A fundamental feature of the process handler 40 based on the present invention is that it can be interrupted by the central instance 5. The process handlers 40 have the interfaces which are required for this. The stopping or interruption of process handlers 40 frees resources 25 within the platform which are needed for an emergency situation, for example. Furthermore, process handlers 40 which have been stopped by the central instance 5 can be instructed thereby to resume performance of the order 1. That is to say that process handlers 40 previously stopped by the central instance 5 can be instructed by the central instance 5 to continue performing the order 1. It goes without saying that the process resources 25 need to be available before continuation.

Furthermore, it is possible for the central instance 5 to instruct a plurality of process handlers 40 simultaneously to perform a plurality of orders 1, provided that the process resources 25 are reserved for each of the active process handlers 40 and hence for the plurality of orders 1.

The meta interfaces 30 appropriate to the process resources 25 of an order 1 (e.g. a print order) manage resources in a system. The meta interfaces 30 can provide process resources 25, which the central instance 5 requests from the meta interfaces 30, for the central instance 5.

In particular, the meta interface 30 engages the resource 20 as the process resource 25 for the order 1. Following performance of the order 1 by the process handler 40 which has been instructed to perform the process 4 by the central instance 5, the process handler 40 returns the process resources 25 used to the central instance 5.

The central instance 5 then decides whether the process resources 25 are returned to the meta interface as free resources 20 or are immediately used for another order 1.

Meta interfaces 30 manage the parallel use of a class of resources 20 present in the system by a plurality of orders 1. Thus, by way of example, all printers available in the system could be managed by way of a meta interface 30. The meta interface 30 knows particularly constraints for the simultaneous use of resources 30 of the same type.

By way of example, the meta interface for managing network interfaces 31 could have a stipulation that only three outgoing network connections can ever leave a client 3. For a client 3 on which processes 1 are run, this means that a maximum of three network connections can leave this client 3 simultaneously.

Provided that the user of the client 3 initiates a further process 1 which wishes to set up an outgoing network connection, this is allocated to the process 1 by the meta interface for managing network interfaces 31 only if a maximum of two outgoing network connections are already open. If three network connections are already open, on the other hand, the fourth request for opening an outgoing network connection is prevented by the meta interface for managing network interfaces 31. This limits the amount of network traffic which leaves a client 3.

Another resource 20 could be computation time on a computer system for calculating complex reconstructions of raw data on said computer system.

It is thus conceivable, by way of example, for the user of a client 3 to initiate an order 1 for reconstructing a 3D data record for the patient Fischer, e.g. from MR tomography data. That is to say that the central instance 5 would request the process resources 25 from the relevant meta interfaces for reconstruction or graphics workstations 33. The meta interface for allocating graphics workstation resources 33 could stipulate, by way of example, that a maximum of one process 1 for reconstruction can run on such a graphics CPU with associated main memory.

If a second request for the same workstation comes from the central instance 5, the allocation of the process resources 25 for reconstruction or graphics workstations is rejected by the relevant meta interfaces for reconstruction or graphics workstations 33. That is to say that the second incoming order 1 for reconstructing a data record is denied. By way of example, this ensures that an order 1 for reconstructing image data can be performed within a prescribed time frame.

The meta interface 30 therefore acts as a semaphore, a model for modeling the simultaneous use of resources which is sufficiently well known to a person skilled in the art in this field. Freedom from deadlock is achieved in an embodiment of the invention through appropriate scheduling and allocation algorithms in the central instance 5 when process resources 25 are requested.

The method according to an embodiment of the invention allows the platform to be expanded by new order types 1b for processes 1 in the course of operation, that is to say at the runtime of the platform. This results particularly from the distributed "intelligence" of the method over a single central instance 5, a queue allocator 10 for coordinating a plurality of queues 15 which are known to the central instance 5, and the meta interfaces 30 for the multiplicity of resources 20 present in the platform.

To add a new order type 1b for a new process type 4a to the platform, it is sufficient to lodge a new queue allocator 10a and a new process handler 40a for the platform in the system, and also possibly new meta interfaces 30a. It is sufficient for the central instance 5 to know the new queue allocator 10a for the new order type 1b.

This can be achieved, by way of example, by means of the association 7 of order type 1a and queue allocator 10, said association having a further entry added to it for a new order type 1b. The new queue allocator 10a in turn knows not only the name of the new queue 15a but also the name of the new process handler 40a. It thus suffices to expand the platform by a new order type 1b, to expand the association 7 by a new entry, the new queue allocator 10a and the new process handler 40a, and possibly to lodge a new meta interface 30a at a suitable location within the platform. When this has been lodged, the update of the association 7 e.g. as a configuration file, suffices to notify the central instance 5 of this new order type 1b. This would allow particularly the expansion of the system at runtime. In addition, individual modules can be exchanged or expanded independently of one another.

Furthermore, the distributed execution of the process steps associated with an initiated order 1 by means of the central instance 5 allows deadlock-free execution of the orders 1 arising in the platform for processes 40. Third-party providers providing expansions for the platform therefore have their work simplified considerably. The third-party provider does not need to implement the new queues 10a or concern itself with deadlock-free resource requesting and prioritized execution of the orders 1.

The text below shows the dynamic flow of the method according to an embodiment of the invention. A client 3 creates an order 1 and sends it to the central instance 5. The central instance finds the associated queue allocator 10 on the basis of the order type. The queue allocator 10 then analyzes the order received in the central instance 5 and then returns the queue name 17 and also possibly a multiplicity of process resources 25 and then optionally a list of process parameters, to the central instance 5. This information means that the central instance 5 knows the queue 15 in which the order 1 needs to be deposited.

Furthermore the process resources 25 performing the order 1 are now known. The queue allocator 10 also returns the name of the process handler 40 which is suitable for the order to the central instance 5. This information allows the central instance 5 to deposit the order 1 in a particular queue 15, possibly taking account of order priorities. If a queue 15 with this name does not yet exist, the central instance 5 creates this new queue 15a.

In addition the central instance 5 can now take the process resources 25 required for performing the order 1 as a basis for reserving them for an order 1 stored in the multiplicity of queues 15. To reserve the process resources 25, the central instance 5 turns to the relevant cases of the meta interface 30 which manage the resources 20, present within the platform, of suitable type for the order 1.

As already mentioned, resources 20 and hence also process resources 25 may cover the use of appliances or include CPU computation time or main memory. It goes without saying that other resources 20 are also conceivable in a platform of this kind without restricting an embodiment of the invention. If all process resources 25 for an order 1 are available, the central instance 5 can instruct the process handler 40 for an order 1 to handle the order 1 and can start the process handler 40.

One or else a plurality of process handler(s) 40 can be executed in a process. For such an embodiment, the queue allocator 10 would need to report the process resources 25 of the first process handler and also the process resources of the other process handlers back to the central instance 5. When all process handlers have accomplished their order, the process resources 25 of the first process handler 40 and the process resources 25 of the other process handlers are returned to the respective meta interfaces. This means that they are available to the platform as resources 20 again.

The solution according to an embodiment of the invention is flexible and expandable. New order types can be added at any time. The actual implementation of the queue allocator 10, the meta interface 30 and the process handler 40 for a given order 1 can always be varied independently at that time. The number of queues is controlled by the queue allocators 10. It is a task of the central instance 5 to manage and know all queues 15. However, the central instance 5 does not create the queues 15 in advance, but rather creates them only on the basis of information provided by the queue allocator 10.

The implementation of the simultaneous requesting of resources 20, that is to say of communication for engaging resources 20, is fully encapsulated by the meta interfaces 30, which likewise simplifies the expansion of the platform.

The logic for the execution of an order 1 is implemented in a process handler 40. This means that the execution of an order 1 is independent of queue management and of resource request protocols. The module of the process handler 40 can thus concentrate solely on the problem to be solved by the order. This significantly simplifies the implementation of the process handler 40. The central instance together with the meta interfaces 30 accomplish the allocation of resources 25 without deadlock, and the orders can be executed via the process handlers 40. In this case, orders 1 can be prioritized when deposited in the queues. In addition, constraints for the use of resources 20 are a further component of the method according to an embodiment of the invention. Such constraints have already been explained above.

It goes without saying that process resources 25 which have been reserved for an order 1 are returned to the central instance 5 when the process handler 40 has ended.

The central instance 5 then decides whether the process resources 25 are returned to the meta interface 30 as free resources 20 or are immediately used for another order 1. In particular, the central instance 5 for distributing resources 25 and for distributing the orders 1 over queues 15 allows all running processes 4 to be controlled. The central instance can stop individual processes 4.

A client 3 within the platform can send warnings, notifications and/or messages to the central instance 5.

A warning can prompt the central instance 5 to send no further orders 1 to process handlers 40, so that fewer running processes actually need to be stopped when a critical state occurs. However, this warning allows all process handlers 40 which are already running to continue. The warning is sent optionally and typically before a critical state occurs.

In contrast to this is a notification to the central instance 5 which comprises notification of the occurrence of a critical state (e.g. data recording has begun). The notification will prompt the central instance 5 to immediately notify the running process handlers 40 so that they stop executing the running processes 4.

The warning is an optional preliminary step in the notification. Clearly, the warning supports the behavior of the platform in critical situations: the warning can result in fewer processes 4 needing to be stopped when the notification about a critical state is received.

It is likewise possible to use a message to provide notification that raw data for a patient (e.g. MR tomography examination of the patient Fischer) are currently being recorded in the scanner and therefore the network traffic to the disk store of the scanner should be limited for further processes 1. Large volumes of write access operations on the disk store by other processes 1 would reduce the speed of the disk for storing the raw data which arise. This can be implemented indirectly by limiting the possible network connections which are simultaneously possible from the disk drive of the scanner.

New order types 1a, new meta interfaces 30a, new queue allocators 10a and new process handlers 40a can be registered by way of various mechanisms within the platform. A possible implementation involves the use of configuration files, a central configuration repository, file system directories into which files are placed, etc. The actual implementation of the disclosure of the individual components of an embodiment of the invention to the central instance 5 does not restrict the spirit of the invention in any way, but rather these are different embodiments which are all clear to a person skilled in the art within the context of this description.

Finally, it should be pointed out that the description of the invention and the exemplary embodiments should be understood, in principle, to be non-limiting in respect of one particular physical implementation of the invention. For a person skilled in the relevant art, it is particularly clear that the invention can be implemented with a partial or complete distribution in software and/or hardware and/or over a plurality of physical products—in this case particularly also computer program products.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for controlling allocations of resources to processes in expandable medical platforms with a central instance and a meta interface for resources, the method comprising:
   receiving an order for a process by a central instance within a medical platform, the order including an order type, wherein at least one order type is a medical emergency process;
   assigning the order to a queue allocator on the basis of the order type, wherein each order type is assigned an individual queue within a plurality of queues;
   ascertaining a multiplicity of process resources, required for performing the order, from resources available within the platform, and ascertaining a queue name by the queue allocator;
   requesting the process resources, by the central instance, from the meta interface;
   allocating the process resources to the order, so that the process resources are available for performing the process; and dead-lock freely performing the order for the process, by at least one process handler, provided that all of the process resources are available, the process resources being released following conclusion of the process and the meta interface being informed, wherein each of the at least one process handler is configured to be stopped and enabled again for further handling based on a notification from the central instance.

2. The method as claimed in claim 1, wherein a plurality of orders are simultaneously receivable and wherein a plurality of processes are simultaneously performable, provided that it is possible for the respective process resources to be allocated to the plurality of orders.

3. The method as claimed in claim 1, wherein the central instance instructs the at least one process handler to perform the order, and the at least one process handler is determined by the order type of the order.

4. The method as claimed in claim 1, wherein the at least one process handler is started by the central instance.

5. The method as claimed in claim 1, further comprising: stopping a running process handler in order to ensure deterministic interruption of the process.

6. The method as claimed in claim 1, further comprising: receiving a warning at the central instance, the central instance not starting another process handler upon receipt of the warning.

7. The method as claimed in claim 1, wherein the central instance stops at least one of the process handlers following receipt of a notification.

8. The method as claimed in claimed in claim 1, further comprising: expanding the medical platform by a new order type for performing a new process.

9. The method as claimed in claim 7, wherein the medical platform is dynamically expandable at runtime.

10. The method as claimed in claim 1, wherein the queue allocator, the at least one process handler and the meta interface are implementable and alterable independently of one another.

11. The method as claimed in claim 1, wherein the order includes a multiplicity of order parameters in addition to the order type.

12. An apparatus for controlling allocations of resources to processes in expandable medical platforms, the apparatus comprising:
one or more processors executing:
a central instance within a medical platform, configured to receive an order for a process, the order including an order type, wherein at least one order type is a medical emergency process;
a queue allocator, configured to allocate the order received in a reception module to a queue on the basis of the order type;
an ascertainment unit, configured to ascertain a multiplicity of process resources, required for performing the order, from resources available within the platform and to ascertain a queue name by the queue allocator;
a requesting module in the central instance to request the process resources from a meta interface;
an allocation module in the meta interface configured to allocate the process resources to the order, so that the process resources are available to perform the process; and
a process handler configured to deadlock-freely perform the process provided that all process resources are available, the process resources being released following conclusion of the process and the meta interface being informed, wherein the one process handler is configured to be stopped and enabled again for further handling based on a notification from the central instance.

13. A non-transitory computer readable medium including program segments for, when executed on a computer device, causing the computer device to implement the method of claim 1.

14. The method as claimed in claim 2, wherein the central instance instructs at least one process handler to perform the order, and the at least one process handler is determined by the order type of the order.

15. The apparatus as claimed in claim 12, wherein the order includes a multiplicity of order parameters in addition to the order type.

* * * * *